United States Patent [19]

Pachschwöll

[11] Patent Number: 4,935,600
[45] Date of Patent: Jun. 19, 1990

[54] SOLDERING APPARATUS WITH ONE OR MORE TEMPERATURE CONTROLLED SOLDERING IRONS

[75] Inventor: Heino Pachschwöll, Waroldern, Fed. Rep. of Germany

[73] Assignee: Zeva GmbH, Arolsen, Fed. Rep. of Germany

[21] Appl. No.: 269,807

[22] Filed: Nov. 9, 1988

[30] Foreign Application Priority Data

Nov. 10, 1987 [DE] Fed. Rep. of Germany ....... 3738155

[51] Int. Cl.$^5$ ............................................. H05B 1/02
[52] U.S. Cl. ..................................... 219/241; 219/240;
219/506; 219/501; 219/497; 340/655;
340/815.01; 340/588
[58] Field of Search ................................ 219/240–242,
219/251, 252, 497, 494, 501, 499, 506, 505;
340/640, 655, 654, 664, 588, 589, 580, 815.01,
815.03

[56] References Cited

U.S. PATENT DOCUMENTS

| | | | |
|---|---|---|---|
| 3,778,581 | 12/1973 | Denny | 219/241 |
| 4,421,976 | 12/1983 | Jurek | 219/506 |
| 4,580,038 | 4/1986 | O'Loughlin | 219/506 |
| 4,825,199 | 4/1989 | Antilozi | 219/506 |

*Primary Examiner*—M. H. Paschall
*Attorney, Agent, or Firm*—Townsend and Townsend

[57] ABSTRACT

A soldering apparatus comprises at least one soldering iron (19) with a heating element (21) and a regulating circuit including a temperature sensor (22) for regulating the working temperature of the soldering iron (19) to a predeterminable desired value (51). The apparatus is characterized by a circuit (45) connected to the soldering unit (19) which at least temporarily stores values corresponding to a time-dependent temperature plot for the soldering iron (19), and also by a monitoring circuit (14) which is connected to the memory circuit. The monitoring circuit monitors during the operation of the soldering iron, from the stored values for the temperature plot, determines whether the temperature undergoes an excursion beneath or above predeterminable upper and lower temperature limits (52, 53) and initiates an alarm signal when the duration of the excursion exceeds a predetermined value.

14 Claims, 4 Drawing Sheets

SOLDERING APPARATUS WITH ONE OR MORE TEMPERATURE CONTROLLED SOLDERING IRONS

BACKGROUND OF THE INVENTION

The present invention relates to a soldering apparatus comprising at least one soldering iron with a heating element and a regulating circuit including a temperature sensor for regulating the working temperature of the soldering iron, for example by feedback control, to a predeterminable desired value.

Soldering apparatus of this kind is available everywhere and is used for diverse soldering tasks on electric circuits, circuitboards etc., in particular when relatively small batches are required. Such small numbers or batches are however frequently encountered in technical fields where the highest degree of reliability is desired, for example in the aerospace field.

In addition to the known temperature regulation circuits individual soldering stations have hitherto only been equipped with an additional operating state indicator. Precision soldering of highly sensitive components thus consequently took place only by visual assessment of the instanteous values and by inherent trust on the function of the regulating circuitry.

Since the requirement is increasingly being made in the aerospace and reactor fields, as examples for typical applications where high reliability technology is required, to document the working process and the working conditions, a considerable expenditure of time was necessary with the previous working methods in order to satisfy this requirement. Indeed this is made more difficult by the fact that under normal manufacturing conditions several workers are employed in parallel with such tasks as a working group, i.e. as a soldering or repair group. It was thus previously necessary for the important soldering parameters to be detected at each of the individual working places. This gave rise to large cost and complexity with regard to the measuring apparatus and the personal requirement.

It has occurred to the applicant that this expenditure and complexity is actually not necessary and the applicant has now therefore set himself the task of so further developing a soldering apparatus of the initially named kind that solder joints of high quality, i.e. so-called precision solder joints, can be carried out reliably and monitored using simple means while retaining the customary soldering iron. Furthermore, documentation of the course of the soldering procedure at the individual soldering stations should be straightforwardly possible.

SUMMARY OF THE INVENTION

In order to satisfy objects there is provided further development of a soldering apparatus of the initially named kind which is characterised by a memory circuit which is connected to the soldering iron and at least temporarily stores values corresponding to a time dependent temperature plot for the soldering iron and also by a monitoring circuit which is connected to the memory circuit, which monitors during the operation of the soldering iron from the stored values for the temperature plot whether the temperature undergoes an excursion beneath or above predeterminable upper and lower temperature limits and which initiates an alarm signal when the duration of the excursion exceeds a predetermined value.

The invention thus starts from the recognition that deficiencies in quality of the soldered components arise when the soldering iron is too cold or too hot for a predetermined period of time during the soldering process. In other words the invention exploits the temperature detection at the working tip of the soldering iron, which is in any case necessary for the regulation of the soldering iron, for an additional task, namely to determine the time-dependent temperature plot at the working tip, to store this and to evaluate it. In other words the invention is based on the recognition that all the faults in the total soldering system which could lead to a soldered joint of low quality are ultimately caused by a temperature change at the working tip of the soldering iron. If, for example, the temperature regulation only fails temporarily then a temperature change will occur at the working tip of the soldering iron. Should a semiconductor component in the regulating circuit burn out, so that the soldering iron is continually heated, then a temperature increase will take place which will be determined and signalised by means of the apparatus of the invention, and indeed directly after the occurrence of the fault.

The soldering apparatus of the invention is preferably characterised by a microprocessor connected to the soldering iron with the microprocessor carrying out the temperature regulation and passing the temperature values determined via the temperature sensor to the memory circuit.

This arrangement makes it possible to precisely determine the progress of the work and makes it possible to select the precise monitoring plan as desired by interchanging the EPROMS associated with the microprocessor.

The soldering iron together with the microprocessor and the storage circuit form a soldering station which can be connected, either on its own or with other like soldering stations, via a data bus with a central command and registration unit, which contains a microcomputer forming the monitoring circuit, and also a screen and a printer, whereby the temperature plot at the individual soldering stations can be displayed and printed out.

With this arrangement several soldering stations can be monitored and the result of the monitoring can be indicated or printed out at any time, so that a permanent record of the respective temperature plots at the individual soldering stations can be obtained.

The command and registration unit preferably has a keyboard or data input device which is particularly constructed for inputting the desired soldering temperature to the individual soldering stations and the upper and lower temperature limits for the or each soldering station.

This has the great advantage that the important operating parameters are input to the central unit and communicated to the individual soldering station, i.e. to each working place. A manipulation at each working place is thus precluded. The keyboard also serves to call up the stored data or to input special data, for example the name of the particular operator at each individual soldering station and particulars relating to the work being carried out, for example the respective numbers of the circuitboards which are being soldered at these locations.

The or each soldering station preferably has a local network (LAN) by means of which it communicates with the microcomputer via the data bus.

The data bus is preferably a single data line and the local network and also the microcomputer are preferably so laid out that they can communicate with one another by means of a CSMA/CD bus protocol. These are simple measures established in the field of computer technology which make communication between microprocessors, and communication of one microprocessor with another possible.

Each soldering station preferably contains a respective EPROM module in which the software for the temperature regulation, for the storage of the temperature plot, for the local network and for the diagnosis of breakdowns arising in the soldering stations are stored. In this manner breakdowns, faults or disturbances which arise in the soldering station itself are indicated to the central command and registration unit via the data bus so that the alarm signal is issued by the central command and registration unit. The alarm signal can be a visual and/or acoustical alarm. The corresponding soldering station is indicated in problemfree manner on the central screen so that the technical management can take the appropriate measures.

Further disturbances, for example interruption of the feedline or interruption in the communication between the individual soldering stations and the central unit are determined via the fault diagnosis software built into the command and registration unit and are likewise displayed and named (described).

An operator actuated switch is preferably present in the individual soldering stations with which the start or end of each soldering task can be indicated to the microcomputer. This represents a simple measure which is very useful for the production of documentation for the individual pieces of work. The switch can be formed as a simple pressure switch, could however naturally also be replaced by a more complicated switching means, for example by a laser head which reads a bar code on the workpiece and which serves for troublefree identification of the workpiece, so that the switch not only signalises the start and the end of the soldering task but also brings the measured temperature plot into troublefree association with the individual workpieces. The coded data which are detected by means of the laser head are naturally communicated to the microcomputer.

Each soldering station is preferably connectable to the mains supply, with the frequency of the AC voltage delivered by the mains serving as the clock signal for the respective soldering station, i.e. for the operation of the associated microprocessor. This represents a simple measure for generating the clock signals that are required. All soldering stations are preferably connected to the same phase of the main supply s that synchronisation is likewise ensured.

A preferred embodiment is characterised in that the or each soldering station contains a transformer which steps down the mains voltage, with the secondary circuit of the transformer containing a fuse and being connected via a microprocessor controlled switch (in particular a triac) and also a current measuring device to the heating element of the soldering iron; in that the current measuring device communicates the current that is measured to the microprocessor; and in that the temperature sensor, the EPROM, the memory circuit which is formed as a RAM and also an on and off switch for setting the soldering station in operation or taking it out of operation are connected to the microprocessor.

Furthermore, a lamp (for example an LED) which indicates the operating state can be provided in the control line between the microprocessor and the triac. This position is of particular importance since the switching on and off of the triac as a result of the temperature regulation leads to blinking of the lamp so that the operator also has an optical control over the normal manner of operation of his soldering iron.

Each soldering station preferably further has an external earth connection which can be used when required in order to lead electrostatic charges to earth.

BRIEF DESCRIPTION OF THE DRAWINGS

The invention will now be explained in more detail by way of example only with reference to an embodiment and to the drawings which show.

DETAILED DESCRIPTION OF THE DRAWINGS

Figure 1:
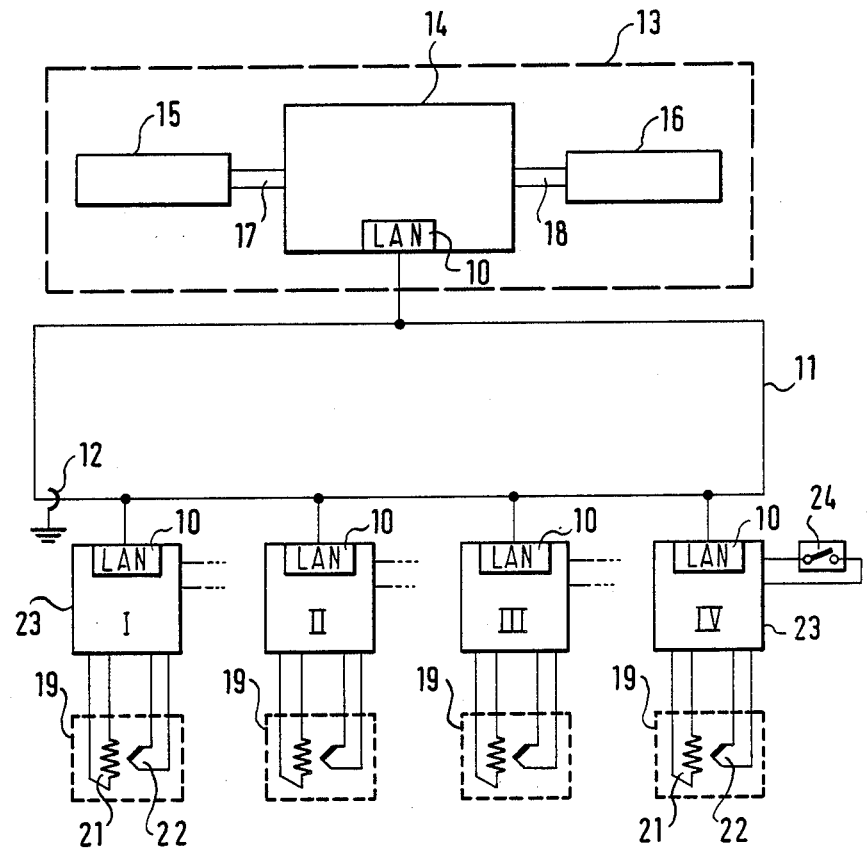
FIG. 1 a schematic block circuit diagram of a soldering apparatus in accordance with the invention with four soldering stations, FIG. 2 a perspective illustration of an individual soldering station with a soldering iron, FIG. 3 the stored temperature plot at a particular soldering station, and FIG. 4 a schematic block circuit diagram for the individual soldering station.

As shown in FIG. 1 the soldering apparatus of the invention includes four individual soldering stations I, II, III, IV which are each respectively connected via a local area network 10 to a ring line 11. The ring line 11 is formed as a single wire line with an earthed screen 12. A central command and registration unit 13 is likewise connected to the ring line 11, and indeed via its own local area network 10. The central command and registration unit 13 which is indicated as a box in broken lines in FIG. 1 comprises a microcomputer and takes the form of a personal computer 14 with a screen. It also includes a printer 15 and a keyboard 16 which is connected with the microcomputer via the respective data lines 17, 18. Each soldering station I to IV is equipped with a customary soldering iron 19 which has an electrical heating element 21 and also a temperature sensor 22.

The four square housings 23 of the individual soldering stations I to IV each contain a microprocessor and a memory circuit which are not shown in FIG. 1 but will however be later explained in more detail with reference to FIG. 4.

It should be pointed out that the number of soldering stations which can be connected to the central command and registration unit 13 via the ring line 11 is in principle unlimited. In the simplest case the central command and registration unit can be equipped with only one soldering station however several such soldering stations will normally be connected thereto. If only one soldering station is desired then the electronics for the soldering station could readily be realised within the microcomputer of the central command and registration unit.

Finally, FIG. 1 also shows a manual switch 24 at the soldering station 23, this switch can be actuated by the operator each time when he starts with a new piece of work, or at the end of each piece of work, so that the microcomputer 14 can display the temperature plot which has been derived. The stations I to III also have a switch 24 of this kind, which is however not shown in FIG. 1 in order not to unnecessarily complicate the representation. The switch 24 represents a preferred embodiment is however not absolutely essential.

Figure 2:
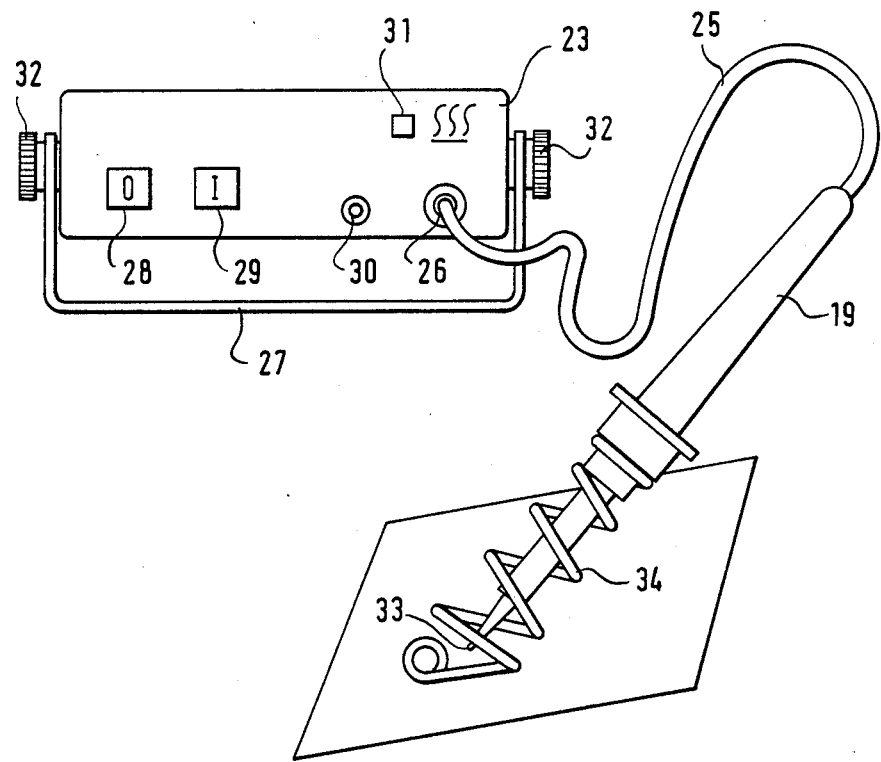

A perspective illustration of an individual soldering station is shown in FIG. 2. As can be seen the soldering iron 19 is connected via a flexible cable 25 and a plug 26 with a complementary sleeve at the housing 23. The housing is provided with a hoop 27 which serves to support the housing 23. The position of the hoop 27 can be adjusted by means of knurled knobs 32. At the front side of the housing there can be seen on and off switches 28, 29 for the soldering station and also a lamp 31 which indicates the operating condition and an external earth connection 30. The working tip 33 of the soldering iron sits in protected manner within a wire cage 34 which consists of wire coils and serves to hold the soldering iron. One can see that the operator has no possibility of specifying or changing any value in the soldering station. He can merely switch the soldering station on and off by means of the switches 28 and 29.

Figure 4:
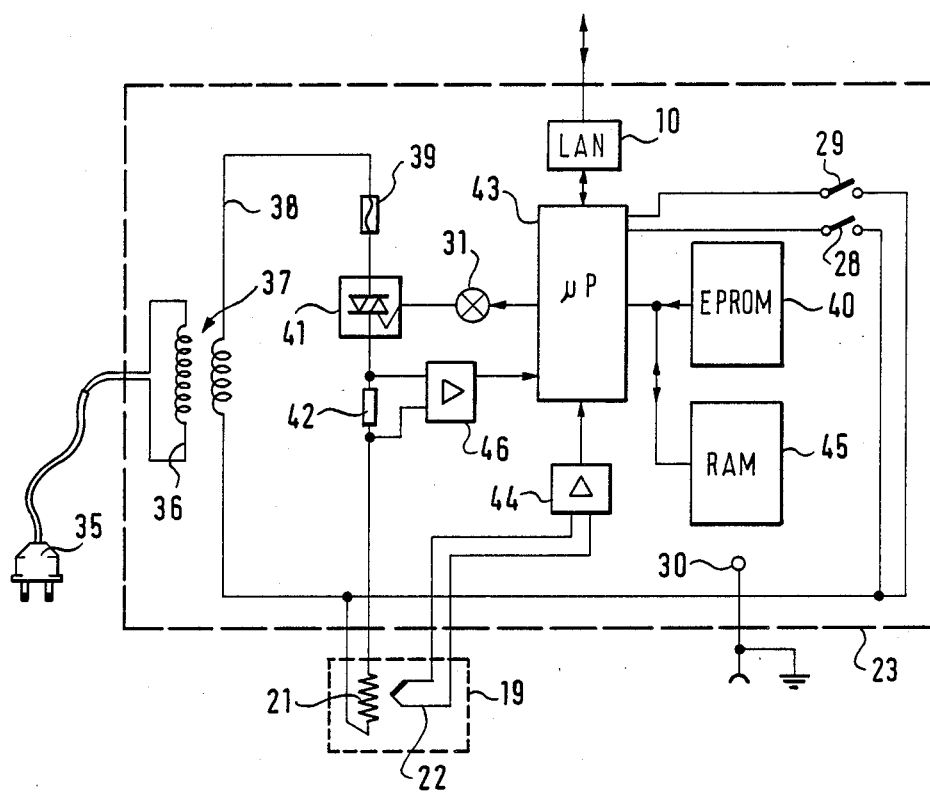

The electrical circuit within the housing 23 is shown in FIG. 4. The housing is connected to the main supply by means of a mains plug 35. The 220 V AC voltage of the power supply is applied to the primary side 36 of a transformer 37 and is there transformed downwardly to an AC voltage of 24 $V_{rms}$. In series with the secondary winding there is a fuse 39, a triac 41, a current measuring resistor 42 and the heating element 21 of the soldering iron 19. The triac 41 serves as an on/off switch and is controlled by the microprocessor 43 in order to hereby enable the supply of current to the heating element 21 and to interrupt it, and thereby to adjust the desired temperature of the heating element 21 and thus of the soldering iron. The actual operating temperature is determined by means of the temperature sensor 22 and is communicated to the microprocessor 43 after amplification in an amplifier 44. The current flowing through the heating element is measured as a voltage drop across the current measuring resistor 42 and is likewise communicated to the microprocessor after amplification in an amplifier 25. The lamp 31 which indicates the operating state is located in the control line of the triac 41.

The desired value for the operating temperature of the soldering iron is input at the keyboard 16 for the particular soldering station and is communicated to the microprocessor 43 via the ring line 11 and its own local network 10. The actual value measured by the temperature sensor 22 is then compared by the microprocessor with the desired value and the regulation of the power supply is then effected via the triac 41 in accordance with the program stored in the EPROM 44.

The temperature value determined by the temperature sensor 22 is read-in to a storage or memory circuit 45 and is temporarily stored there. The storage, which can take place in accordance with a program stored in the EPROM 44 makes it possible to store the temperature plot over a time period of approximately 4 min. After this time the stored pieces of data are automatically deleted however not at once but rather bitwise in accordance with the reading in of each new piece of data (FIFO).

The microcomputer of the central command and registration unit 13 is so programmed that it interrogates the individual soldering stations in a preselectable sequence in steps of one second in each case, i.e. one soldering station per second, and the values stored in the RAM 45 at this time are read-in to the main memory of the microcomputer 14 of the command and registration unit and retained there. Accordingly, temporary storage of the temperature values in the RAM memory 45 is entirely sufficient. The quoted time period of 4 min. can naturally be selected as desired, it must however be matched to the size of the memory capacity available and to the corresponding program module of the EPROM 44. Although the interrogation mode preferably takes place in steps of one second, these steps could also be made longer or shorter as desired.

FIG. 4 also shows the on and off switches 28 and 29 and the external earth connection 30.

The reasons why the storage capacity of the RAM's 45 is dimensioned for a temperature plot of approximately 4 min. duration, whereas the microcomputer 14 interrogates the individual soldering stations at intervals of one second, are several. First of all this storage offers security against eventual disturbances.

Furthermore, it is not always desired to determine the temperature plot so precisely, for example with soldering tasks where precise soldering is not desired or soldering tasks where documentation of the temperature plot is not required. The operator has however the possibility, via the switch 24, of also subsequently communicating the stored data to the microcomputer should he consider this necessary.

Figure 3:
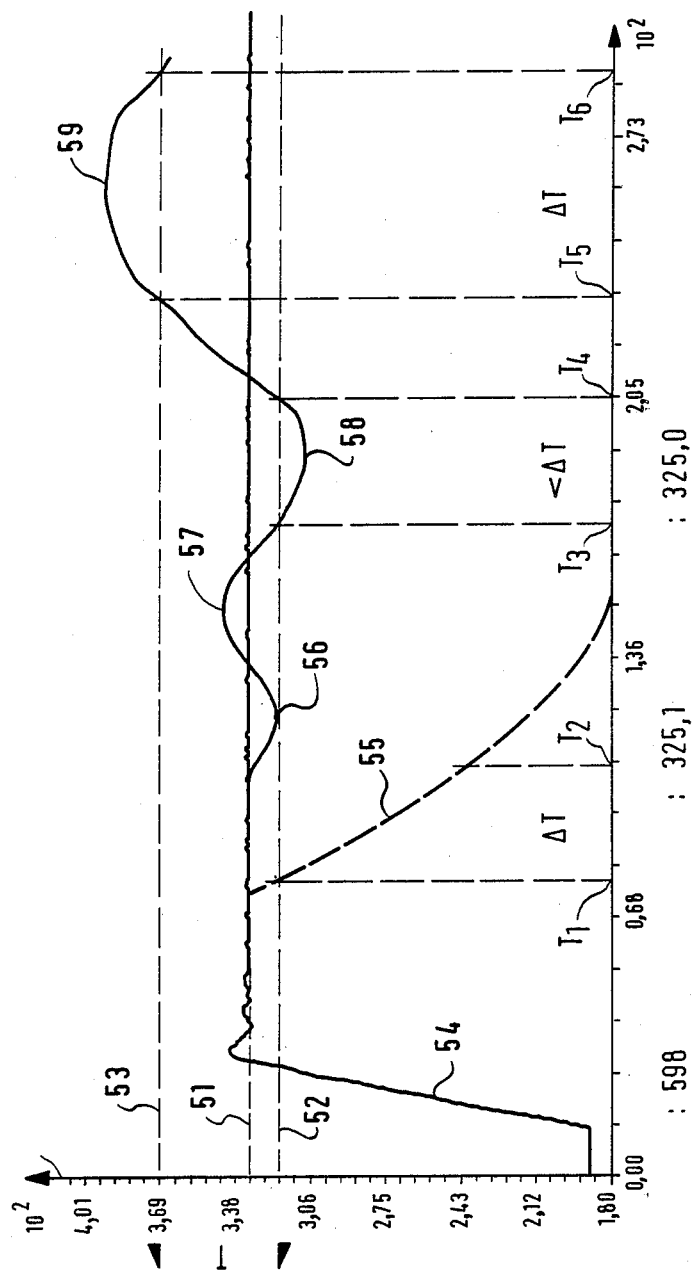

Finally, an example for the temperature plot that is determined is shown in FIG. 3. In FIG. 3 temperature is recorded on the vertical axis and time on the horizontal axis. The line 51 indicates the desired value for the temperature, in this case 325°. The lines 52 and 53 determine the lower temperature limit or threshold and the upper temperature limit or threshold, which the temperature may not fall short-off or exceed respectively. The desired value 51 and also the temperature thresholds 52, 53 can be set for the particular soldering station (here soldering station IV) via the keyboard at the central command and registration unit 13 and can be varied individually.

So long as no temperature fluctuations occur during the actual operation of the soldering iron which fall short of the temperature threshold 52 or exceed the temperature threshold 53, everything is in order from the quality viewpoint and no alarm signal is initiated.

The original rapid rise 54 of the temperature plot takes place due to the warming up following switching on of the soldering station. Should the fuse or the heating element burn out then no electrical energy would any longer be transmitted to the soldering iron and this temperature would drop as indicated at 55.

One can see that the temperature has fallen beneath the lower temperature threshold at a time $T_1$ and it is now determined whether after a predetermined duration $\Delta T$ which terminates $T_2$ ($T_1+T=T_2$) the temperature still lies beneath the temperature limit. This is the case with the temperature plot 55 and an alarm is signalled by the central command and registration unit 3.

FIG. 3 also shows the execution of a normal soldered joint at 56. During soldering heat is extracted from the soldering iron and the characteristic sinks, however not below the lower temperature threshold 52. After carrying out the soldering the operating temperature again rises under the action of the regulating circuit until it has once again reached the desired value 51. As a result of the inertia of the system the temperature however continues to increase, as shown at 57, it does not however reach the upper temperature threshold 53 so that no disturbance is indicated here.

The operator subsequently executes a further soldered joint, must however keep the soldering iron at the soldered joint for too long due to clumsy handling, so that even more heat is extracted, and the temperature drops again below the lower threshold 52 as indicated at 58. This takes place at a time $T_3$. As the temperature has again reached the lower threshold 52 at a time $T_4$ within a period of time which is smaller than $\Delta_T (T_4 - T_3 < \Delta T)$ this excursion below the lower temperature limit is not indicated as an error and no alarm indication is given. If $T_4 + T_3$ were $> \Delta T$ an alarm indication would be given.

A fault in the regulating circuit then occurs, so that the temperature exceeds the upper temperature limit at a time $T_5$. Since this temperature excursion still prevails at a time $T_6$ which is larger than $\Delta T$ ($T_6 - T_5 > \Delta T$) an alarm is also indicated here.

The temperature plot which has been determined can also be printed out by the printer in the manner which is shown in FIG. 3 and forms a protocol over the soldered joints which have been effected. Naturally all other important particulars relating to the individual workpiece or to the operator can be stored as desired, this is only a question of the input at the keyboard and of the programming of the microcomputer 14.

The management personnel can also call up such temperature plots on the screen of the central command and registration unit 13 for the individual soldering stations and can also monitor the particular operating parameters at the individual soldering stations by means of pillar diagrams or the like. With this kind of presentation the desired and actual values for the individual stations are shown alongside one another on the central screen so that reliable information concerning the overall situation is always available from this position. The values are indicated in absolute manner, i.e. numerically, and also graphically in a scale. As already signified the tolerance ranges for the working places can either be made the same size for all stations by a corresponding input or, if this should prove necessary, the tolerance range at the individual stations can also be individually selected.

In order to precisely detect the progress of the work each station can be dialled up, i.e. addressed, from the central unit. Vice versa the stations can also call up the central unit in order to pick-up a working profile via the curve plot in dependence on the prevailing circumstances.

Thus each characteristic specific to a piece of work can be picked up and recorded. The recording can also be printed out by the printer as a so-called hard copy.

With this type of value detection it is possible for the first time to detect the situation prevailing during the manufacture of each individual soldered joint of a group of components, for example in the form of a temperature/time function. The printed out document can then accompany the workpiece. In this way it is possible to have access to this data as desired, for example on failure of an apparatus. Naturally these pieces of data can also be conserved in a data store.

The detection of the measured values for the stations is furthermore so conceived that all data can be stored for a specific period, similar to the function of a flight logger. Thus a decision can be taken both before the start of the working rhythm which is to be defined and also after the finish thereof whether the parameters or situations should be recorded. This call-up is possible from the central unit to all attached stations. In just the same way the individual stations can determine by calling up the central unit when and whether their respective measurement data and situations should be protrayed graphically as a curve and printed out as a hard copy.

The apparatus of the invention offers the following advantages:

that the parameters can be transmitted from the central command unit to the individual stations, thus precluding any possibility of manipulation, that the situation and the parameters of all stations in the group can be interrogated in a preselectable sequence, that the faults in the system can be analysed and characterised, that the minimum and maximum values and the tolerances which are respectively permissible can be fed in in parallel, that all parameters and situations can be simultaneously displayed on the central screen, that deviations from the desired value can be made notable via an acoustical and optical warning system, that the time in which the parameter deviation or the normal deviation of the situation is indicated can be individually selected, that all operating parameters or relevant situation states can be graphically indicated in order to represent the analog states, that the individual stations can dial-up the central unit in order to portray the actual values in the form of a graph, the central unit can dial-up the stations in order to call-up the prevailing values to establish a characteristic line or graph, that the stations have the possibility of storing all parameters and operating states for a period which can be specified in order to transfer them when required to the central unit, that the pieces of data which are not called up are automatically cancelled again similar to the situation with a flight logger, that a determination can be made via a selection circuit whether the subsequent data should be detected, or whether historic data should be transferred to the central unit, that all values which are represented on the screen can also be printed out in the form of a separate hardcopy.

What is claimed is:

1. Soldering apparatus comprising at least one soldering iron (19) with a heating element (21) and a regulating circuit including a temperature sensor (22) for regulating the working temperature of the soldering iron (19) to a predeterminable desired value, the apparatus being characterized by a memory circuit (45) which is connected to the soldering iron (19) and which stores values corresponding to a time dependent temperature plot for the soldering iron (19), and also by a monitoring circuit (14) which is connected to the memory circuit, which monitoring circuit monitors during the operation of the soldering iron from the stored values for the temperature plot whether the temperature undergoes an excursion beneath or above respective predetermined lower and upper temperature limits, and which monitoring circuit initiates an alarm signal when the duration of an excursion exceeds a predetermined value.

2. Soldering apparatus in accordance with claim 1, characterised by a microprocessor (43) connected to the soldering iron, with the microprocessor carrying out the temperature control and supplying the temperature values determined via the temperature sensor to the memory circuit (45).

3. Soldering apparatus in accordance with claim 2, characterized in that the soldering iron (19) together with the microprocessor (43) and the memory circuit (45) form a plurality of individual soldering stations which are connected via a data bus (11) to a central command and registration unit (13); and in that said central command and registration unit (13) contains a microcomputer (14) forming the monitoring circuit and also a screen and a printer (15); whereby the temperature plot at the individual soldering stations can be displayed and printed out.

4. Soldering apparatus in accordance with claim 3, characterized by data input means which forms a part of the command and registration unit (13) and is particularly laid out for the input of the soldering temperature and also the upper and lower temperature thresholds for each soldering station.

5. Soldering apparatus in accordance with claim 3, characterized in that each soldering station has its own local network by means of which it communicates with the microcomputer (14) via the data bus (11).

6. Soldering apparatus in accordance with claim 5, characterised in that the data bus (11) is a single wire line; and in that the local networks (10) and also the microcomputer (14) are so laid out that they communicate with one another by means of a CSMA/CD bus protocol.

7. Soldering apparatus in accordance with claim 3, characterized in that the or each soldering station contains a respective EPROM module (40) in which the software for the temperature regulation, for the storage of the temperature plot, for the local area network (10) and for the diagnosis of disturbances arising in the soldering stations is stored.

8. Soldering apparatus in accordance with claim 3, characterised in that operator actuated switch means (24) is present with which the start or end of each soldering task can be indicated to the microcomputer (14).

9. Soldering apparatus in accordance with claim 3, characterized in that each soldering station can be connected to the mains, with the frequency of the AC voltage delivered by the mains serving as a clock signal for the soldering station or for the operation of the microprocessor (13).

10. Soldering apparatus in accordance with claim 4, characterised in that each soldering station contains a transformer (37) for stepping down the mains voltage, with the secondary circuit (38) of said transformer containing a fuse (39) and being connected via a microprocessor controlled switch and a current measuring device (47) to the heating element (21) of the soldering iron; in that the current measuring device (42) communicates the current measured to the microprocessor; and in that the temperature sensor (22), the EPROM (40) and the memory circuit (45) and also an on/off switch (28, 29) for setting the soldering stations in operation and for terminating said operation are connected to said microprocessor.

11. Soldering apparatus in accordance with claim 10, characterised in that said microprocessor controlled switch comprises a triac (4).

12. Soldering apparatus in accordance with claim 10, characterised in that said memory circuit (45) is constructed as a RAM.

13. Soldering apparatus in accordance with claim 11, characterised in that an indicator light (31) showing the operating state is provided in the control line between the microprocessor (43) and the triac (41).

14. Soldering apparatus in accordance with claim 3, characterized in that an external earth connection (32) is provided for each soldering station.

* * * * *